US011710135B2

(12) United States Patent
Soramäki et al.

(10) Patent No.: US 11,710,135 B2
(45) Date of Patent: Jul. 25, 2023

(54) SYSTEM AND METHOD FOR ESTABLISHING AND MANAGING INTER-INSTITUTION TRANSACTION SYSTEM

(71) Applicant: FINANCIAL NETWORK ANALYTICS LTD, London (GB)

(72) Inventors: Kimmo Soramäki, London (GB); Samantha Cook, London (GB)

( * ) Notice: Subject to any disclaimer, the term of this patent is extended or adjusted under 35 U.S.C. 154(b) by 0 days.

(21) Appl. No.: 17/022,227

(22) Filed: Sep. 16, 2020

(65) Prior Publication Data

US 2022/0084040 A1 Mar. 17, 2022

(51) Int. Cl.
*G06Q 20/42* (2012.01)
*G06F 9/38* (2018.01)
*G06Q 20/38* (2012.01)
*G06Q 20/40* (2012.01)

(52) U.S. Cl.
CPC ......... *G06Q 20/425* (2013.01); *G06F 9/3836* (2013.01); *G06Q 20/389* (2013.01); *G06Q 20/401* (2013.01)

(58) Field of Classification Search
CPC .. G06Q 20/425; G06Q 20/389; G06Q 20/401; G06F 9/3836
USPC .......................................................... 705/39
See application file for complete search history.

(56) References Cited

U.S. PATENT DOCUMENTS

| 9,104,500 | B1 | 8/2015 | Krikellas et al. | |
| 9,128,750 | B1 | 9/2015 | August et al. | |
| 9,405,800 | B1* | 8/2016 | Kapoor | G06Q 20/10 |
| 10,975,970 | B2* | 4/2021 | Shu | F16K 1/2263 |
| 11,189,293 | B1* | 11/2021 | Vijayvergia | G10L 15/30 |
| 2004/0039689 | A1* | 2/2004 | Penney | G06Q 40/03 |
| | | | | 705/38 |

(Continued)

FOREIGN PATENT DOCUMENTS

| EP | 3772718 A1 * | 2/2021 | ............ G06Q 40/02 |
| WO | WO-2021044185 A1 * | 3/2021 | ............ G06Q 40/02 |

OTHER PUBLICATIONS

Norman, Ben; Liquidity saving in real-time gross settlement systems—an overview; May 2010; Bank of England https://web.archive.org/web/20200530003428/https://www.bankofengland.co.uk/-/media/boe/files/financial-stability-paper/2010/liquidity-saving-in-real-time-gross-settlement-systems-an-overview (Year: 2010).*

(Continued)

*Primary Examiner* — Lindsay M Maguire
*Assistant Examiner* — Michael J Warden
(74) *Attorney, Agent, or Firm* — RC Trademark Company

(57) ABSTRACT

Disclosed is a method of establishing and managing an inter-institution transaction system. The method comprises creating plurality of threads to constitute parallel fund transfer system, wherein each thread is a replica of single fund transfer system, and wherein plurality of threads are to be operated in parallel; assigning plurality of institutions to plurality of threads, wherein a given institution is assigned as a sending institution and/or a receiving institution of a financial transaction to at least one thread, and a given thread has at least one sending institution-receiving institution pair assigned thereto; assigning financial transactions to plurality of threads based at least on sending institution-receiving institution pairs assigned to plurality of threads; and processing financial transactions at their corresponding threads.

14 Claims, 6 Drawing Sheets

(56) References Cited

U.S. PATENT DOCUMENTS

2009/0254907 A1 10/2009 Neary
2010/0269110 A1 10/2010 Leijen et al.
2020/0226284 A1* 7/2020 Yin ..................... G06Q 50/265

OTHER PUBLICATIONS

A new RTGS service for the United Kingdom: safeguarding stability, enabling innovation; Sep. 16, 2016; Bank of England https://www.bankofengland.co.uk/-/media/boe/files/payments/a-new-rtgs-service-for-the-uk-safeguarding-stability-enabling-innovation.pdf (Year: 2016).*
Rotemberg, Julio; Minimal Settlement Assets in Economies with Interconnected Financial Obligations; Feb. 2011; Journal of Money, Credit, and Banking vol. 43, No. 1 pp. 81-108 https://www.jstor.org/stable/20870040 (Year: 2011).*
Hall, John; The Future of Clearing and Settlement in Australia: A Discussion Paper; Mar. 2000; Reserve Bank of Australia https://web.archive.org/web/20171014093423/https://www.rba.gov.au/payments-and-infrastructure/resources/publications/payments-au/future-clearing.pdf (Year: 2000).*
Willison, Matthew, Real-Time Gross Settlement and Hybrid Payment Systems: A Comparison (Mar. 2005). https://ssrn.com/abstract=724042 or http://dx.doi.org/10.2139/ssrn.724042 (Year: 2004).*
Bech, Morten; Global Trends In Larger-Value Payments; Sep. 2008; FRBNY Economic Policy Review https://web.archive.org/web/20161224084442/https://www.newyorkfed.org/medialibrary/media/research/epr/08v14n2/0809prei.pdf (Year: 2008).*
Arcese, Mauro; Real-Time Gross Settlement systems: breaking the wall of scalability and high availability; Mar. 2021; Banca D'Italia https://www.bancaditalia.it/pubblicazioni/mercati-infrastrutture-e-sistemi-di-pagamento/approfondimenti/2021-002/N.2-MISP.pdf (Year: 2021).*
International Search Report and Written Opinion of the International Searching Authority issued in International Patent Application No. PCT/IB2021/058457 dated Jan. 20, 2022, 13 pages.

* cited by examiner

SYSTEM AND METHOD FOR ESTABLISHING AND MANAGING INTER-INSTITUTION TRANSACTION SYSTEM

TECHNICAL FIELD

The present disclosure relates generally to transaction systems; and more specifically, to methods of establishing and managing inter-institution transaction systems. The present disclosure also relates to systems for establishing and managing inter-institution transaction systems. The present disclosure also relates to computer-readable mediums carrying instructions that when loaded into and executed by data processing arrangements cause the data processing arrangements to execute methods of establishing and managing an inter-institution transaction system. The present disclosure also relates to software module systems comprising software modules to be executed by data processing arrangements for establishing and managing an inter-institution transaction system.

BACKGROUND

Over the past decades, inter-institution transaction systems have been widely used for facilitating large-value payments in many countries. Such inter-institution transaction systems constitute a major aspect of the global financial and economic structure. Most economic activities are facilitated by transfers of claims by institutions. In such a case, the transfers of claims generate financial transactions between institutions when the financial transactions are not settled across books of a single institution. These payments of the financial transactions are settled in inter-institution payment systems. In this manner, the inter-institution transaction systems provide a backbone for all financial transactions.

As reliance on inter-institution transaction systems and value of payments through the inter-institution transaction systems increases, smooth and efficient functioning of such systems is of central concern for policymakers and regulators. This can be attributed to the large volume of financial transactions associated with large-value fund transfer systems employed in the inter-institution transaction systems, the pivotal role of the large-value fund transfer systems in the functioning of inter-institution transaction systems, and the implementation of monetary policies.

Presently, most large-value fund transfer systems operate as real-time gross settlement (RTGS) systems in the inter-institution transaction systems. In the RTGS system, financial transactions are settled immediately and irrevocably in real time with no netting (gross). However, the inventors have realized that when the inter-institution transaction system utilizes the RTGS system, it suffers from several limitations. Firstly, the inter-institution transaction system is able to process only a limited number of financial transactions in a given amount of time. In such a case, when the number of transactions are greater than said limit, there are delays in processing the financial transactions due to inability of the inter-institution transaction systems to process such transactions immediately. This leads to overloading of the inter-institution transaction system. Secondly, due to said delays, institutions associated with the inter-institution transaction system may have less available liquidity, increased liquidity risk, and potentially limited ability to carry out business. Other fund transfer systems (for example, such as deferred net settlement systems) where payments are settled in netting cycles that take place at regular intervals (for example, every hour) and institutions pay/receive net amount they owe/are owed are prone to other problems such as increased credit risk for the institutions.

Therefore, in light of the foregoing discussion, there exists a need to overcome the aforementioned drawbacks associated with the inter-institution transaction system utilizing existing large-value fund transfer systems.

SUMMARY

One object of the teachings herein is to overcome or at least mitigate the problems of the prior art.

As the inventors have realised after inventive and insightful reasoning, there are problems, as are discussed briefly above, in that existing inter-institution transaction systems are able to process only a limited number of financial transactions in a given amount of time. Said systems are prone to system overloading when processing a very high volume of financial transactions, and that leads to delays and inefficiency. Due to said delays, institutions associated with such systems may have less available liquidity, increased liquidity risk, potentially limited ability to carry out business, and other associated problems.

According to one aspect, the object is achieved by providing a method of establishing and managing an inter-institution transaction system, the method comprising:
  creating a plurality of threads to constitute a parallel fund transfer system, wherein each thread is a replica of a single fund transfer system, and wherein the plurality of threads are to be operated in parallel;
  assigning a plurality of institutions to the plurality of threads, wherein a given institution is assigned as a sending institution and/or a receiving institution of a financial transaction to at least one thread, and a given thread has at least one sending institution-receiving institution pair assigned thereto;
  assigning financial transactions to the plurality of threads based at least on sending institution-receiving institution pairs assigned to the plurality of threads; and
  processing the financial transactions at their corresponding threads.

Institutions in large-value fund transfer systems both send and receive financial transactions. Each transaction has both a sender and receiver, and the sender and receiver are generally different institutions.

Embodiments of the present disclosure enable the method to allow creation of the parallel fund transfer system in an efficient manner that does not require a new fund transfer system to be designed or modifications (namely, changes) to be made to existing architecture of the single fund transfer system. Notably, said creation only requires one or more replications of the single fund transfer system (for example, the RTGS system). Advantageously, presence of multiple threads operating in parallel allows processing of a greater number of financial transactions in a given amount of time without overloading the inter-institution transaction system and without causing delays in processing the financial transactions. The parallel fund transfer system and its parallel transaction processing capabilities make the inter-institution transaction system highly efficient and robust. Notably, the method allows each thread to operate in an identical fashion with respect to risk controls (such as multilateral limits, bilateral limits, overdraft limits, queuing policies to mention a few), and transaction settlement processing. Moreover, the method safeguards from problems such as increased credit risk for institutions associated with other fund transfer systems (for example, such as deferred net settlement systems).

In one embodiment, the given institution is assigned to two or more threads, and the method further comprises dynamically allocating liquidity of the given institution to each of the two or more threads.

In one embodiment, the dynamic allocation of the liquidity of the given institution to each of the two or more threads is based on at least one of: a number of counterparties of the given institution in each of the two or more threads, current liquidity requirements across the two or more threads, projected liquidity requirements across the two or more threads, current liquidity balance of the given institution.

In one embodiment, the method further comprises optimizing a number of threads in the parallel fund transfer system based on at least one of: a number of institutions associated with the inter-institution transaction system, an average volume of the financial transactions processed by the inter-institution transaction system, a flow of financial transactions between the plurality of institutions.

In one embodiment, the method further comprises performing network community detection by:
  obtaining transaction data pertaining to historical transactions undertaken by the plurality of institutions;
  creating a network of nodes and links using the transaction data, wherein each institution among the plurality of institutions is represented as a node of the network and a financial transaction between two institutions is represented as a link between nodes of the two institutions; and
  grouping the nodes into a plurality of communities based on a number of the links between the nodes, wherein a number of intra-community links is substantially greater than a number of inter-community links, and wherein each community comprises two or more institutions.

In one embodiment, when grouping the nodes into the plurality of communities, a number of communities is constrained to be equal to a number of threads when the number of threads is pre-known.

In one embodiment, assigning the plurality of institutions to the plurality of threads is performed based on the network community detection by:
  preliminarily assigning to a given thread, institutions belonging to a same community;
  identifying, for each institution, one or more other institutions with which said institution has a transaction history;
  determining, for the one or more other institutions corresponding to a given institution, whether or not there already exists any thread to which both of a given other institution and the given institution are assigned; and
  assigning the given institution to a smallest thread to which the given other institution is preliminarily assigned, when it is detected that there does not exist any thread to which both of the given other institution and the given institution are assigned.

In one embodiment, when assigning the plurality of institutions to the plurality of threads, a number of threads to which the given institution is assigned is minimized whilst ensuring that prospective financial transactions of the given institution would be settled in at least one thread.

In one embodiment, assigning the financial transactions to the plurality of threads comprises:
  identifying, for a given sending institution-receiving institution pair pertaining to a given financial transaction, one or more threads to which said pair is assigned; and
  selecting a given thread to which the given financial transaction is to be assigned, based on a number of the one or more threads to which said sending institution-receiving institution pair is assigned, and optionally at least one of: a volume of financial transactions that have been processed at the one or more threads within a recent time period, liquidity allocated to the one or more threads and/or a sequence of the one or more threads to which said sending institution-receiving institution pair is assigned.

In one embodiment, selecting a given thread to which the given financial transaction is to be assigned further comprises:
  determining if there is only one thread to which said pair is assigned, and if so, selecting that thread as the given thread, and,
  if there is more than one thread to which said pair is assigned, selecting the given thread based on the volume of financial transactions that have been processed at the threads within a recent time period.

In one embodiment, selecting a given thread to which the given financial transaction is to be assigned further comprises determining if the liquidity allocated to a thread is sufficient to cover the given financial transaction before selecting the thread as the given thread.

According to another aspect, the object is achieved by providing a computer-readable medium carrying instructions that when loaded into and executed by a data processing arrangement causes the data processing arrangement to execute a method of establishing and managing an inter-institution transaction system.

According to yet another aspect, the object is achieved by providing a software module system comprising software modules to be executed by a data processing arrangement for establishing and managing an inter-institution transaction system, wherein the software modules comprises:
  a software module for creating a plurality of threads to constitute a parallel fund transfer system, wherein each thread is a replica of a single fund transfer system, and wherein the plurality of threads are to be operated in parallel;
  a software module for assigning a plurality of institutions to the plurality of threads, wherein
  a given institution is assigned as a sending institution and/or a receiving institution of a financial transaction to at least one thread, and
  a given thread has at least one sending institution-receiving institution pair assigned thereto;
  a software module for assigning financial transactions to the plurality of threads based at least on sending institution-receiving institution pairs assigned to the plurality of threads; and
  a software module for processing the financial transactions at their corresponding threads.

According to still another aspect, the object is achieved by providing a system for establishing and managing an inter-institution transaction system, the system comprising a data processing arrangement configured to:
  create a plurality of threads to constitute a parallel fund transfer system, wherein each thread is a replica of a single fund transfer system, and wherein the plurality of threads are to be operated in parallel;
  assign a plurality of institutions to the plurality of threads, wherein a given institution is assigned as a sending institution and/or a receiving institution of a financial transaction to at least one thread, and a given thread has at least one sending institution-receiving institution pair assigned thereto;

assign financial transactions to the plurality of threads based at least on sending institution-receiving institution pairs assigned to the plurality of threads; and process the financial transactions at their corresponding threads.

In one embodiment, in the system, wherein the given institution is assigned to two or more threads, and the data processing arrangement is further configured to dynamically allocate liquidity of the given institution to each of the two or more threads.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following drawings wherein.

DETAILED DESCRIPTION

The following detailed description illustrates embodiments of the present application and ways in which they can be implemented. Although some modes of carrying out the present teachings have been disclosed, those skilled in the art would recognize that other embodiments for carrying out or practising the present teachings are also possible.

Figure 1:
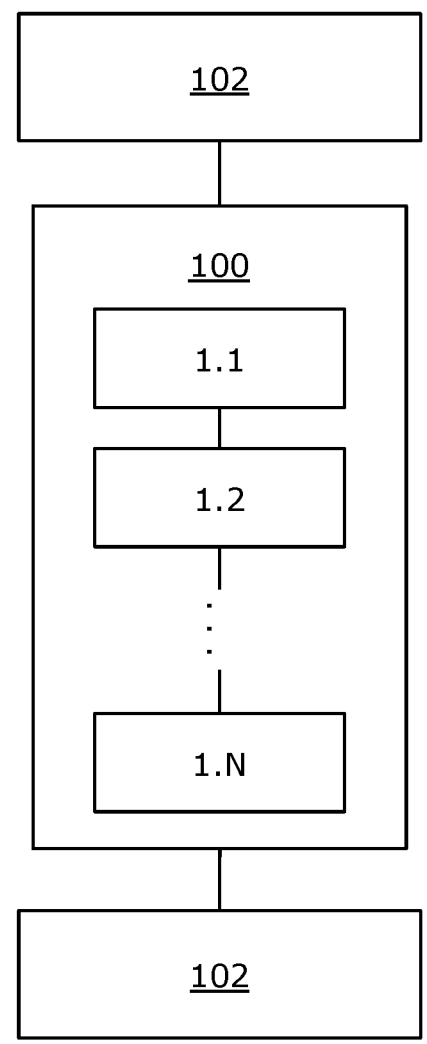
FIG. 1 illustrates an exemplary single fund transfer system.

Referring to FIG. 1, illustrated is an exemplary single fund transfer system 100. The single fund transfer system 100 manages transactions between a plurality of institutions 102. The plurality of institutions 102 comprises all institutions associated with the single fund transfer system 100. When any institution among the plurality of institutions 102 initiates a transaction with another institution among the plurality of institutions 102, the single fund transfer system 100 facilitates the transaction between such institutions by executing, for example, a multi-step process (depicted as steps 1.1, 1.2, . . . , 1.N) for settling the transaction. The multi-step process of settling the transaction comprises debiting an account of a first institution and crediting an account of a second institution. When the transaction is settled in bilateral netting cycles or multilateral netting cycles, the multi-step process of settling the transaction has more steps.

Herein, the term "single fund transfer system" refers to an electronic fund transfer system having a single execution path for processing financial transactions at a given time. When processing the financial transaction, funds are transferred between two or more institutions.

It will be appreciated that the single fund transfer system 100 is a large-value payment fund transfer system. In such a case, the single fund transfer system 100 deals in large-value transactions (for example, such as transactions undertaken for business activities).

The single fund transfer system 100 is optionally a real-time gross settlement (RTGS) system. In the RTGS system, financial transactions are processed by undertaking transfer of funds from one institution to another institution instantaneously in real-time. The RTGS system is a preferably safe and secure for large-value financial transactions undertaken by the institutions.

Figure 2:
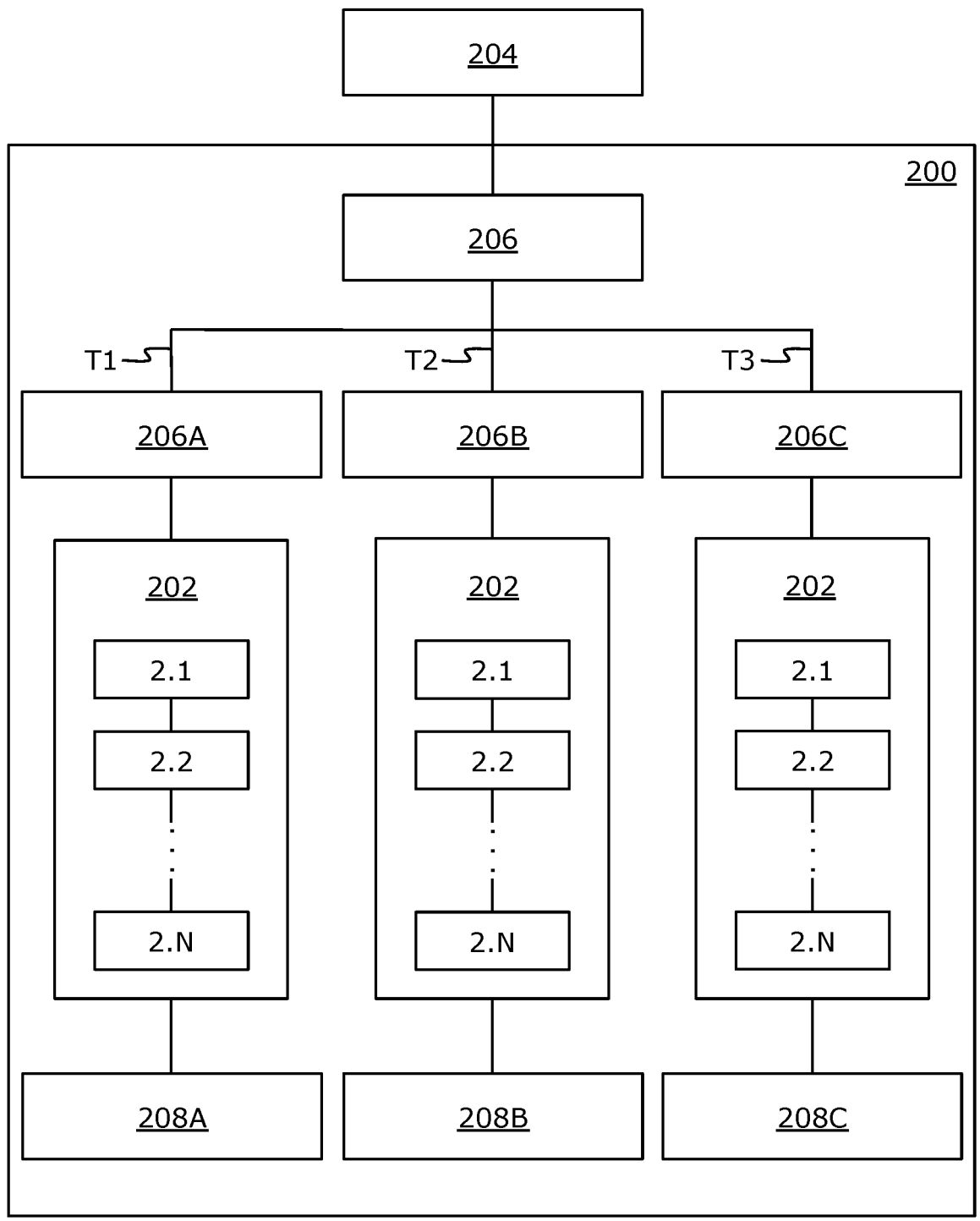
FIG. 2 illustrates an exemplary parallel fund transfer system, according to one embodiment of the teachings herein.

Referring to FIG. 2, illustrated is an exemplary parallel fund transfer system 200, according to one embodiment of the teachings herein. The parallel fund transfer system 200 is constituted by a plurality of threads, each thread being a replica of a single fund transfer system 202 (for example, such as the single fund transfer system 100 of FIG. 1). As shown, the parallel fund transfer system 200 is constituted by three threads T1, T2, and T3. The threads T1, T2, and T3 (hereinafter denoted collectively as T1-T3) are replicas of a single fund transfer system 202. The parallel fund transfer system 200 manages transactions between a plurality of institutions 204 associated therewith. The plurality of institutions 204 comprises all institutions associated with the parallel fund transfer system 200. To each thread, there is assigned a select set of sending institutions and a select set of receiving institutions, from amongst the plurality of institutions 204. As shown, for example, the threads T1-T3 are assigned select sets 206A, 206B, and 206C of sending institutions and select sets 208A, 208B, and 208C of receiving institutions, respectively, from amongst the plurality of institutions 204. In this way, the plurality of institutions 204 are assigned to the threads T1-T3, wherein a given institution is assigned as a sending institution and/or a receiving institution of a financial transaction to at least one thread. As shown, a thread selection module 206 is configured to assign financial transactions to the plurality of threads T1-T3. When a given financial transaction is assigned to a given thread, for example, such as the thread T1, the single fund transfer system 202 facilitates the given transaction between the set 206A of sending institutions and the set 208A of receiving institutions by executing, for example, a multi-step process (depicted as steps 2.1, 2.2, . . . , 2.N) for settling the given transaction.

In an embodiment, the select set 206A, 206B, and 206C of sending institutions is same as the select set 208A, 208B, and 208C of receiving institutions. When a given institution would only be the sending institution in a given thread, there is a likelihood of liquidity crisis for the given institution. It will be appreciated that when the given institution is both a sending institution and a receiving institution in the given thread, the likelihood of liquidity crisis for the given institution will be reduced.

The parallel fund transfer system 200 is different from the single fund transfer system 100 in that the parallel fund transfer system 200 has a parallel processing architecture which is made up of parallel threads of execution paths for processing financial transactions at a given time. The parallel fund transfer system 200 has a higher transaction processing rate, lower transaction delays, higher robustness, and higher scalability as compared to the single fund transfer system 100.

It may be understood by a person skilled in the art that the FIG. 2 is a simplified illustrated of the exemplary parallel fund transfer system 200 for sake of clarity, which should not unduly limit the scope of the claims herein. The person skilled in the art will recognize many variations, alternatives, and modifications of embodiments of the present disclosure.

Establishment and usage of a parallel fund transfer system, such as the parallel fund transfer system 200 of FIG. 2, will be described in more detail in conjunction with FIGS. 3 and 4.

Figure 3:
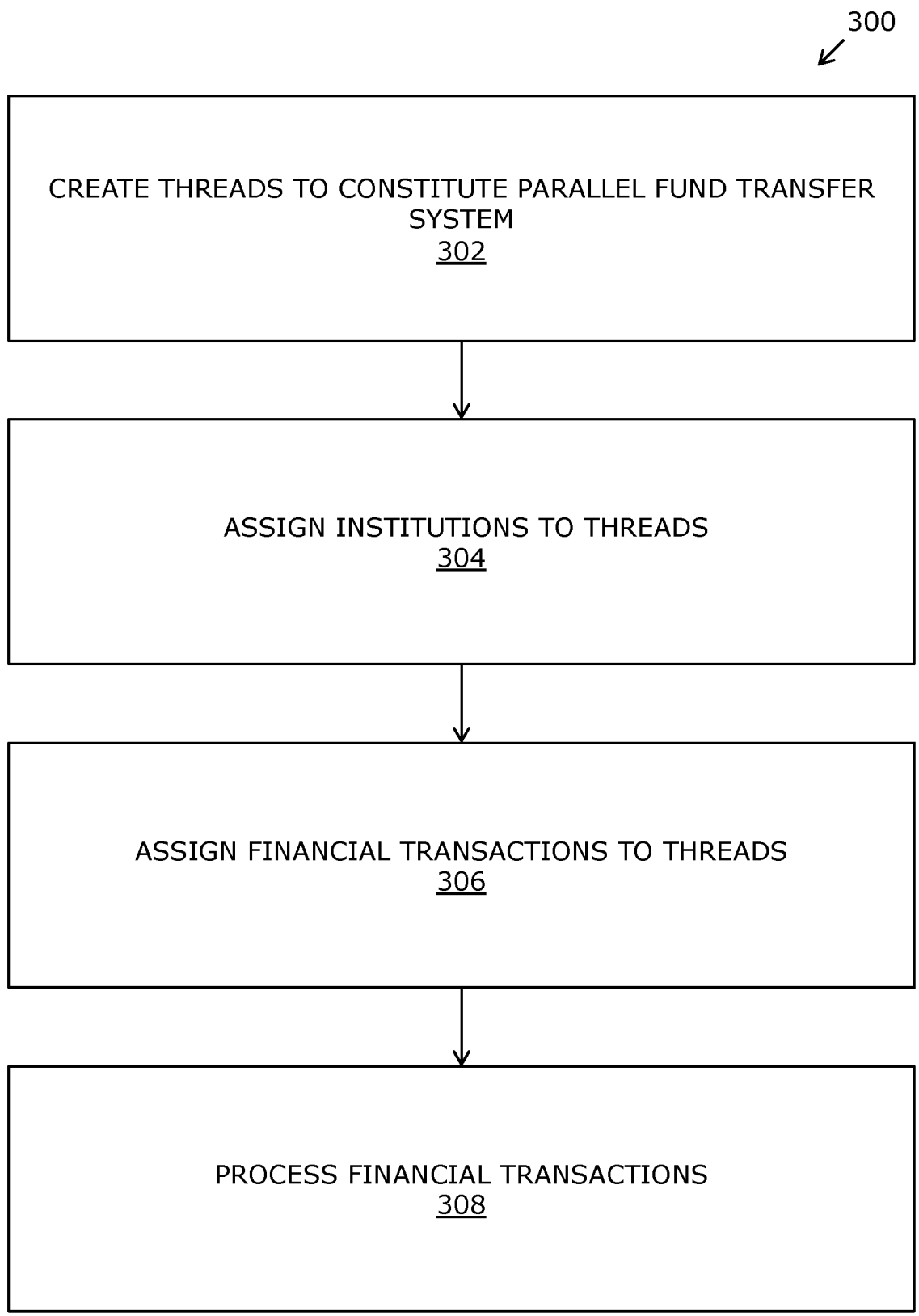
FIG. 3 illustrates a method of establishing and managing an inter-institution transaction system, according to one embodiment of the teachings herein.

Referring to FIG. 3, illustrated are steps of a method 300 of establishing and managing an inter-institution transaction system, according to one embodiment of the teachings herein. At step 302, a plurality of threads are created to constitute a parallel fund transfer system. Each thread is a replica of a single fund transfer system. The plurality of threads are to be operated in parallel. At step 304, a plurality of institutions are assigned to the plurality of threads. A given institution is assigned as a sending institution and/or a receiving institution of a financial transaction to at least one thread, and a given thread has at least one sending institution-receiving institution pair assigned thereto. At step 306, financial transactions are assigned to the plurality of threads based at least on sending institution-receiving institution pairs assigned to the plurality of threads. At step 308, the financial transactions are processed at their corresponding threads.

The steps 302 to 308 are only illustrative and other alternatives can also be provided where one or more steps are added, one or more steps are removed, or one or more steps are provided in a different sequence without departing from the scope of the claims herein.

Herein, the method 300 allows creation of the parallel fund transfer system 200 in an efficient manner that does not require a new transaction system to be designed or modifications (namely, changes) to be made to existing architecture of the single fund transfer system 202. Notably, said creation only requires one or more replications of the single fund transfer system 202 (for example, the RTGS system). Advantageously, presence of multiple threads operating in parallel allows processing of a greater number of financial transactions in a given amount of time without overloading the inter-institution transaction system and without causing delays in processing the financial transactions. The parallel fund transfer system 200 and its parallel transaction processing capabilities make the inter-institution transaction system highly efficient and robust. Notably, the method 300 allows each thread to operate in an identical fashion with respect to risk controls (such as multilateral limits, bilateral limits, overdraft limits, queuing policies, to mention a few), and transaction settlement processing. Moreover, the method 300 safeguards from problems such as increased credit risk for institutions associated with other fund transfer systems (for example, such as deferred net settlement systems).

Figure 4:
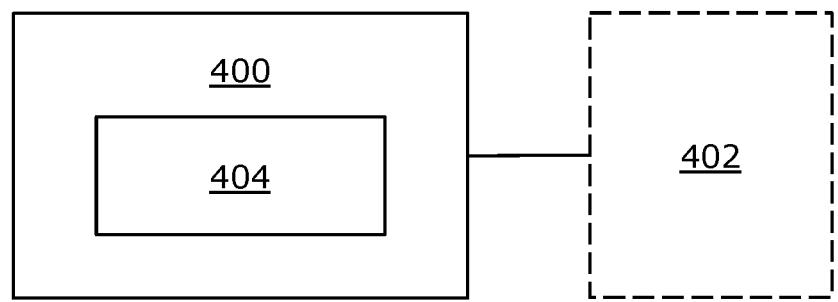
FIG. 4 illustrates a system for establishing and managing an inter-institution transaction system, according to one embodiment of the teachings herein.

Referring to FIG. 4, illustrated is a system 400 for establishing and managing an inter-institution transaction system 402, according to one embodiment of the teachings herein.

The system 400 comprises a data processing arrangement 404 configured to:
  create a plurality of threads to constitute a parallel fund transfer system, wherein each thread is a replica of a single fund transfer system, and wherein the plurality of threads are to be operated in parallel;
  assign a plurality of institutions to the plurality of threads, wherein a given institution is assigned as a sending institution and/or a receiving institution of a financial transaction to at least one thread, and a given thread has at least one sending institution-receiving institution pair assigned thereto;
  assign financial transactions to the plurality of threads based at least on sending institution-receiving institution pairs assigned to the plurality of threads; and
  process the financial transactions at their corresponding threads.

Throughout the present disclosure, the term "data processing arrangement" refers to a hardware, software, firmware, or a combination of these, for performing specialized data processing tasks of the system 400. Such specialized data processing tasks pertain to establishment and management of the inter-institution transaction system 402.

In some embodiments, the data processing arrangement 404 is implemented as a single server, whereas in other embodiments, the data processing arrangement 404 is implemented as a plurality of servers.

In an embodiment, the data processing arrangement 404 comprises at least one module configured to perform at least one type of data processing task. Examples of the at least one module include, but are not limited to, a transaction processing module, an information storage and retrieval module, a command and control module, and an input/output module.

Herein, the system 400 can easily be used to establish and manage the inter-institution transaction system 402 without need for any major changes to the existing architecture design of the single fund transfer system. Moreover, the system 400 allows convenient scalability in terms of ease of incorporating new institutions to the inter-institution transaction system 402 and creating new threads in the parallel fund transfer system 200 to account for changes in flow of financial transactions between the plurality of institutions. The system 400 is safe, reliable and secure for large-value financial transactions undertaken by the institutions, and can be implemented at a minimal cost. The system 400 is robust and does not require an overhaul (for example, in case of malfunctioning of one or more threads).

The system 400 facilitates uninterrupted processing of financial transactions without delays and overloading.

Examples of embodiments according to the teachings herein will now be described in detail with simultaneous reference to FIGS. 2, 3, and 4.

The method 300 and the system 400 enable establishment and management of the inter-institution transaction system (such as the inter-institution transaction system 402). The "inter-institution transaction system" is an electronic transaction system that facilitates transactions between different institutions. In particular, the transactions facilitated by the inter-institution transaction system 402 are financial transactions. Throughout the present disclosure, the term "institution" refers to a financial institution which engages in financial transactions such as deposits, loans, investments, currency exchanges, and the like. Examples of a given institution include, but are not limited to, a bank, a credit union, a trust company, a mortgage loan company, an insurance company, and a brokerage firm.

In an embodiment, the inter-institution transaction system 402 is established as an integral part of the system 400. In another embodiment, the inter-institution transaction system 402 is established as an external system that is coupled to the system 400.

A plurality of threads are created 302 (for example, such as the plurality of threads T1-T3 of FIG. 2) to constitute the parallel fund transfer system (for example, such as the parallel fund transfer system 200). Notably, the data processing arrangement 404 of the system 400 is configured to create the plurality of threads T1-T3 to constitute the parallel fund transfer system 200.

Throughout the present disclosure, the term "parallel fund transfer system" refers to an electronic fund transfer system that simultaneously processes multiple transactions by employing parallel processing. Such parallel processing of the parallel fund transfer system 200 is enabled by the plurality of threads T1-T3, wherein each thread forms an execution path of processing financial transactions. Therefore, in the parallel fund transfer system 200, the multiple transactions can be processed simultaneously via multiple threads. Each thread is a replica of a single fund transfer system (for example, such as the single fund transfer system 202). Therefore, the parallel fund transfer system 200 can be thought of as a plurality of the single fund transfer systems (for example, a real-time gross settlement (RTGS) system) that are operated in parallel.

The parallel fund transfer system 200 comprises the plurality of threads T1-T3 that operate parallelly in a manner that the multiple transactions are carried out between the plurality of institutions 204 which are associated with the parallel fund transfer system 200. It will be appreciated that each thread operates in an identical fashion with respect to risk controls, system architecture, and settlement processing. Advantageously, when the plurality of threads T1-T3 are operated parallelly in the parallel fund transfer system 200, an appreciably higher number of financial transactions are processed in a given amount of time. Notably, presence of the plurality of threads T1-T3 means that many more financial transactions may be processed in the given amount of time as compared to the single fund transfer system, without causing any delays due to overloading of the inter-institution transaction system 402.

In the given amount of time, the number of financial transactions processed by the parallel fund transfer system 200 is much higher than the number of financial transactions processed by the single fund transfer system. As an example, in the parallel fund transfer system 200, there may be processed up to thrice as many financial transactions as compared to the single fund transfer system 202, in a given time period.

Notably, the parallel fund transfer system 200 is a part of the inter-institution transaction system 402. The parallel fund transfer system 200 constitutes only a fund transfer mechanism of the inter-institution transaction system 402. The inter-institution transaction system 402 is a comprehensive electronic transaction system that would include additional modules (for example, input/output modules, institution assignment modules, liquidity allocation modules, thread selection modules, and the like).

In an embodiment, the plurality of threads T1-T3 are created to constitute the parallel fund transfer system 200 using existing single fund transfer systems. Such a manner of integrating the single fund transfer system into the parallel fund transfer system 200 does not require any modifications (namely, changes) to an existing architecture design of the existing single fund transfer system. Said creation of the plurality of threads T1-T3 can be implemented efficiently by replicating the single fund transfer system to form a parallel thread processing mechanism of the inter-institution transaction system 402.

In an embodiment, the method 300 further comprises optimizing a number of threads T1-T3 in the parallel fund transfer system 200 based on at least one of: a number of institutions associated with the inter-institution transaction system, an average volume of the financial transactions processed by the inter-institution transaction system, a flow of financial transactions between the plurality of institutions. In an embodiment, the data processing arrangement 404 of the system 400 is configured to optimize the number of threads in the parallel fund transfer system 200 based on at least one of the aforesaid criteria. It will be appreciated that "optimizing the number of threads" in the parallel fund transfer system 200 refers to dynamically adjusting (by increasing or decreasing) the number of threads to optimally and efficiently utilize processing resources of the parallel fund transfer system 200.

In an example, the number of threads in the parallel fund transfer system may be increased/decreased when the number of institutions 204 in the inter-institution transaction system 402 increases/decreases. This can be attributed to a current increase/decrease or an anticipatory increase/decrease in the average volume of the financial transactions due to current increase/decrease or anticipatory increase/decrease in the number of institutions. Anticipatory change in the average volume of the financial transactions may be computed as a projected volume of financial transactions. The phrase "volume of financial transactions" may be understood to be system traffic (namely, transaction traffic within the inter-institution transaction system 402).

In another example, when the average volume of the financial transactions processed by the inter-institution transaction system 402 on a daily basis is considerably high (for example, equal to or greater than 90 percent of a total volume of financial transactions that can be processed by the inter-institution transaction system 402), the number of threads in the parallel fund transfer system 200 may be increased to enhance capacity of the inter-institution transaction system 402.

The plurality of institutions 204 are assigned 304 to the plurality of threads (for example, such as the plurality of threads T1, T2, and T3 of FIG. 2). Notably, the data processing arrangement 404 of the system 400 is configured to assign the plurality of institutions 204 to the plurality of threads T1-T3.

The plurality of institutions 204 are assigned to the plurality of threads T1-T3 such that any given institution is assigned to at least one thread. In such a case, the given institution can be assigned to one thread or to multiple threads. Notably, the plurality of institutions 204 are assigned to the plurality of threads T1-T3 based on their role in financial transactions as determined based on historical transaction data, in one embodiment, or based on estimated transaction data in one embodiment. In one embodiment, the financial transactions are current or pending transactions.

In one embodiment, at least one of the plurality of institutions 204 is assigned to the plurality of threads T1-T3 based on user input.

For a given transaction, the sending institution is a payer (namely, an originator), whereas the receiving institution is a receiver (namely, a recipient). For a given transaction, the receiving institution is a beneficiary, whereas the sending institution is a benefactor. It will be appreciated that generally, the sending institution may have at least one beneficiary, and the receiving institution may have at least one benefactor. It will also be appreciated that the process of assigning the plurality of institutions 204 to the plurality of threads T1-T3 is simple and logical in that new institutions can easily be incorporated into the parallel fund transfer system 200 without the need for any major changes to the existing architecture design of the single fund transfer system 202 of each thread.

For bidirectional transaction flows of a given institution, the given institution may be a sending institution for some transactions and a receiving institution for other transactions, and so may its counterparties. For example, when an institution P is a part of 5 bidirectional transactions with a counterparty Q, the institution P may be a sender in 3 out of the 5 transactions and may be a receiver in 2 out of 5 transactions. Correspondingly the counterparty Q will also change its role as a sender in 2 transactions and as a receiver in 3 transactions.

Notably, the given institution can be assigned as the sending (and/or receiving) institution for financial transaction(s) with some institutions to at least one thread, while being assigned as the receiving (and/or sending) institution for other financial transaction(s) with other institutions to other thread(s).

In a first example, the plurality of institutions 204 may comprise five institutions A1, A2, A3, A4, and A5. Each of the institutions A1-A5 may be assigned as both sending and receiving institutions to their corresponding threads. The institutions A1, A2, and A3 may be assigned to the thread T1, the institutions A3, A4 and A5 may be assigned to the thread T2, whereas the institutions A1, A2 and A5 may be assigned to the thread T3.

When the plurality of institutions 204 are assigned to the plurality of threads T1-T3, any given thread amongst the plurality of threads T1-T3 has at least one sending institution-receiving institution pair assigned thereto. Without even a single sending institution-receiving institution pair assigned to it, the given thread would be unable to process financial transactions. In some embodiments, the given thread has a single sending institution-receiving institution pair assigned thereto, whereas in other embodiments, the given thread has a plurality of sending institution-receiving institution pairs assigned thereto.

Referring to the first example, the thread T1 may have four sending institution-receiving institution pairs assigned thereto. Herein, a first sending institution-receiving institution pair may be pair A1-A2. Likewise, a second sending institution-receiving institution pair may be pair A1-A3. Likewise, a third sending institution-receiving institution pair may be pair A2-A1. Likewise, a fourth sending institution-receiving institution pair may pair A3-A2.

In an embodiment, when the given institution transacts with a large number of other given institutions, the given institution is assigned (as the sending institution or the receiving institution) to a large number of threads. This assignment may optionally be based on a maximum number of institutions that can be assigned to any given thread, wherein the maximum number of institutions is limited by a maximum number of sending institutions and a maximum number of receiving institutions.

In an embodiment, when assigning the plurality of institutions 204 to the plurality of threads T1-T3, a number of threads to which the given institution is assigned is minimized whilst ensuring that prospective financial transactions of the given institution would be settled in at least one thread.

In this regard, when the given institution is assigned to multiple threads (for example, such as the institution A2 being assigned as the sending institution to two threads T1 and T3), there would arise a need to manage liquidity allocations of the given institution for each of such threads. Therefore, when the given institution is assigned to a large number of threads, there would be considerable processing effort to manage liquidity of the given institution across said threads. In such a case, the liquidity of the given institution should be sufficiently allocated to each of the threads in order to settle one or more financial transactions in each of the threads. In such a case, when the given institution is assigned to a large number of threads, there is a likelihood of occurrence of liquidity crisis and incurred loss thereupon for the given institution. Moreover, the management of liquidity allocation across each of the threads could be complex. Therefore, the number of threads to which the given institution is assigned is minimized to safeguard the given institution from the liquidity crisis, the incurred loss thereupon, and complexity of liquidity management. In an embodiment, when assigning the plurality of institutions 204 to the plurality of threads T1-T3, the data processing arrangement 404 is configured to minimize the number of threads to which the given institution is assigned whilst ensuring that prospective financial transactions of the given institution would be settled in at least one thread.

Throughout the present disclosure, the term "liquidity" refers to availability of liquid assets of a given institution in a given thread in order to settle one or more financial transactions in the given thread. Herein, the term "liquid assets" refers to assets that can readily be converted into cash. Examples of the liquid assets may include, but are not limited to, cash, funds, marketable securities, treasury bills.

In an embodiment, when the given institution is assigned to two or more threads, the method further comprises dynamically allocating liquidity of the given institution to each of the two or more threads. In an embodiment, the given institution is assigned to two or more threads, and the data processing arrangement 404 is further configured to dynamically allocate liquidity of the given institution to each of the two or more threads.

In an embodiment, the dynamic allocation of the liquidity of the given institution to each of the two or more threads occurs in real time or near-real time. It will be appreciated that settlement of a given transaction would be expedited by facilitating spontaneous dynamic allocation of the liquidity as and when required. This leads to minimization of delays in the settlement of the given transaction.

It will be appreciated that when, in some embodiments, the given institution is assigned to the two or more threads, the given institution has separate liquidity allocations (namely, liquidity pools) for each of the two or more threads. The liquidity allocations for each of the two or more threads may be changed (namely, increased or decreased) dynamically, by the data processing arrangement 404, in order to efficiently settle the one or more financial transactions in each of the two or more threads. In this regard, said change is done by re-allocating the liquidity of the given institution for each of the two or more threads. In an example, when liquidity allocated to a given institution in a given thread amongst two or more threads is insufficient to settle a given transaction, dynamic allocation of liquidity of the given institution could be done to allocate more liquidity to the given thread from other thread(s) amongst the two or more threads. In this way, the liquidity of the given institution is re-allocated amongst two or more threads. This would save the given transaction from delay and/or failure by averting liquidity crisis in the given thread. The dynamic allocation of liquidity leads to successful settlement of the given transaction. In this regard, the dynamic allocation of liquidity minimizes likelihood of transaction delay and/or failure due to insufficient liquidity (namely, the liquidity crisis).

In an embodiment, the dynamic allocation of the liquidity of the given institution to each of the two or more threads is based on at least one of: a number of counterparties of the given institution in each of the two or more threads, current liquidity requirements across the two or more threads, projected liquidity requirements across the two or more threads, current liquidity balance of the given institution.

In an embodiment, greater the number of counterparties of the given institution in a given thread amongst the two or more threads, greater is an amount of liquidity allocated towards the given thread. This can be attributed to a high volume of the financial transactions between the given institution and the high number of counterparties of the given institution that are assigned to the given thread. In order to settle this high volume of financial transactions, a high amount of liquidity of the given institution is allocated to the given thread. In an example, there may be a given institution B, wherein the given institution B may be assigned to the plurality of threads T1-T3 as a sending institution. The given institution B may have a liquidity worth $50 million. The given institution B may have 10, 25, and 5 counterparties in the threads T1, T2, and T3, respectively. Therefore, the liquidity of the given institution B may be dynamically allocated to each of the threads T1, T2, and T3 such that the threads T1, T2, and T3 may have a liquidity allocation of $15 million, $25 million, and $10 million, respectively.

In an embodiment, greater the current liquidity requirements and/or the projected liquidity requirements across the given thread amongst the two or more threads, greater is an amount of liquidity allocated towards the given thread. This can be attributed to a high current volume of the financial transactions and/or a high projected volume of the financial transactions undertaken by the given institution and its counterparties assigned to the given thread. In order to settle this high volume of financial transactions, a high amount of current liquidity and/or a high amount of projected liquidity across the given thread is required. In such a case, a high amount of liquidity of the given institution is allocated to the given thread.

It will be appreciated that as liquidity requirements (current liquidity requirements and/or the projected liquidity requirements) across the given thread change through a period of time, there is required re-allocation of the liquidity of the given institution. In an embodiment, such re-allocation of the liquidity is performed periodically and/or intermittently across the given thread by the data processing arrangement 404, using the dynamic allocation described herein.

It will be appreciated that the current liquidity requirements and/or the projected liquidity requirements may depend on the number of counterparties of the given institution in each of the two or more threads. In an embodiment, greater the number of counterparties of the given institution in the given thread amongst the two or more threads, greater is the current liquidity requirement and/or the projected liquidity requirement across the given thread amongst the two or more threads. It will also be appreciated that the current liquidity requirements and/or the projected liquidity requirements may not depend or depend to a lesser degree on the number of counterparties of the given institution in each of the two or more threads. In an embodiment, for a given thread, low number of counterparties of the given institution can undertake high value of financial transactions that require high amount of current liquidities and/or high amount of projected liquidities across the given thread.

In an example, there may be a given institution C, wherein the given institution C may be assigned to two threads V1 and V2. Herein, the given institution has a high current volume of the financial transactions to the thread V1, whereas a low current volume of the financial transactions to the thread V2. In such a case, the current liquidity requirement across the thread V1 may be high, whereas the current liquidity requirement across the thread V2 may be low. In such a case, an amount of liquidity allocated towards the given thread V1 is higher than that of the thread V2.

In an embodiment, greater the current liquidity balance of the given institution, greater is an amount of liquidity that can be allocated towards a given thread. Herein, "liquidity balance" refers to liquidity available with the given institution, said liquidity being unallocated to any thread. It will be appreciated that the current liquidity balance of the given institution varies across time. In an example, at start of a day, a total liquidity balance of the given institution may be divided (by default) equally amongst five threads to which the given institution may be assigned as a sending institution. Around middle of the day, the given institution may have insufficient liquidity across two thread amongst the five threads, and may have excess liquidity across other remaining three threads. In such a case, the liquidity is re-allocated amongst the five threads, based on the current liquidity balance of the given institution and/or the projected liquidity requirements across the five threads to settle the day's remaining financial transactions.

In an embodiment, the data processing arrangement 404 is configured to optimize allocation of the liquidity of the given institution to each of the two or more threads based on aforesaid criteria of dynamic allocation of the liquidity of the given institution to each of the two or more threads.

In an embodiment, the method 300 further comprises performing network community detection by:
  obtaining transaction data pertaining to historical transactions undertaken by the plurality of institutions 204;
  creating a network of nodes and links using the transaction data, wherein each institution among the plurality of institutions 204 is represented as a node of the network and a financial transaction between two institutions is represented as a link between nodes of the two institutions; and
  grouping the nodes into a plurality of communities based on a number of the links between the nodes, wherein a number of intra-community links is substantially greater than a number of inter-community links, and wherein each community comprises two or more institutions.

Figure 5:
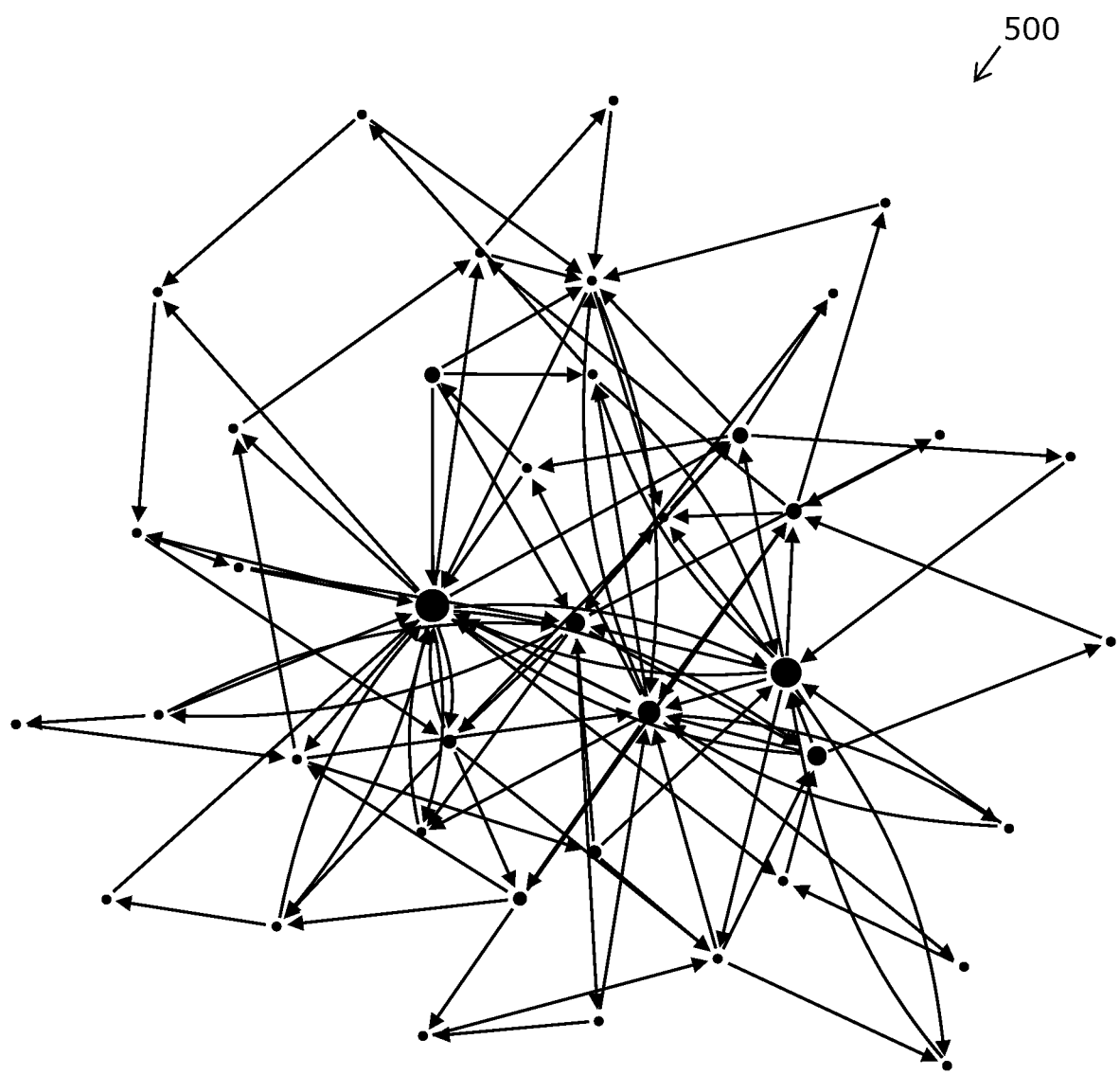
FIG. 5 illustrates an exemplary network of nodes and links, according to one embodiment of the teachings herein.

Referring to FIG. 5, illustrated is an exemplary network 500 of nodes and links, according to one embodiment of the teachings herein. The network 500 is a scale-free network. The network 500 is created using transaction data undertaken by a plurality of institutions. In the network 500, the plurality of institutions are represented as nodes and financial transactions between the plurality of institutions are represented as links between the nodes. The nodes are depicted as dots and the links are depicted as arrows in the network 500. The arrows indicate directions of the financial transactions, wherein a given arrow points from a sending institution to a receiving institution.

In an embodiment, the data processing arrangement 404 is configured to obtain the transaction data. Herein, the term "transaction data" refers to data and/or information pertaining to the historical transactions undertaken by the plurality of institutions 204. In an embodiment, the transaction data is stored at a data repository associated with the inter-institution transaction system 402. Therefore, the data processing arrangement 404 is communicably coupled to the data repository for obtaining the transaction data from the data repository. In an embodiment, the data processing arrangement 404 is configured to collect the transaction data from the plurality of institutions and store the transaction data at the data repository. In an embodiment, the data repository is external to the system 400. Herein, the term "data repository" refers to hardware, software, firmware, or a combination of these for storing the transaction data in an organized (namely, structured) manner, thereby, allowing for easy storage, access (namely, retrieval), updating and analysis of the transaction data. It will be appreciated that the data repository is implemented by way of a database arrangement, a database server, and the like.

In an embodiment, the data processing arrangement 404 is configured to create the network of nodes and links using the transaction data. Each institution among the plurality of institutions 204 is represented as a distinct node in the network. Every financial transaction between two institutions is directional, wherein one institution acts as a sending institution and other institution acts as a receiving institution. Therefore, for each historical transaction, a link is added between nodes of its associated institutions (namely, its associated sending institution and receiving institution).

In an embodiment, the link between the nodes of the two institutions is a non-directed link. Such a link merely extends between the two institutions to indicate that the two institutions engaged historically in a transaction, without indicating roles of the two institutions in the transaction.

In another embodiment, the link between the nodes of the two institutions is a directed link extending from a sending institution to a receiving institution among the two institutions. In this way, the directed link indicates the sending institution and receiving institution for its corresponding financial transaction. It will be appreciated that when directional flow of financial transactions is bidirectional, the directed link would be present in both directions between a pair of nodes of the two institutions.

In an embodiment, the method 300 further comprises assigning, to a given link, a weight corresponding to at least one of: a value of a financial transaction pertaining to the given link, a volume of financial transactions between institutions corresponding to nodes associated with the given link. In an embodiment, the data processing arrangement 404 is configured to assign the weight to the given link. It will be appreciated that the weight could be an unbounded value (for example, equal to value of the financial transaction or equal to volume of the financial transaction) or be a bounded value (for example, lying within a range of a weighting scale). Different weighting scales of different ranges may be employed, as required. In an embodiment, the weight lies within a range of 0 to 1. For example, the weight may be from 0, 0.05, 0.10, 0.15, 0.20, 0.25, 0.30, 0.35, 0.40, 0.45, 0.50, 0.55, 0.60, 0.65, 0.70, 0.75, 0.80, 0.85, 0.90 or 0.95 up to 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95 or 1.

According to an embodiment, the given link is assigned a high weight when the value of the financial transaction pertaining to the given link is high. In an example, when value of financial transactions pertaining to two links may be equal to €80,000 and €2 million, respectively, the two links may be assigned weights equal to 80,000 and 2 million, respectively.

According to another embodiment, when the volume of financial transactions between two institutions associated with the given link is high, the given link is assigned a high weight. In an example, when volume of financial transactions pertaining to two links may be equal to 4500 and 2500, respectively, the two links may be assigned weights equal to 0.95 and 0.55, respectively.

In an embodiment, the data processing arrangement 404 is configured to group the nodes into the plurality of communities based on the number of the links between the nodes. In this way, the data processing arrangement 404 performs the network community detection as an attempt to systematically group the nodes (representing the plurality of institutions) into the plurality of communities to identify their inter-relationships. Said grouping is performed in manner that number of links within nodes of a given community (namely, the intra-community links) is substantially greater than a number of links between nodes of different communities (namely, the inter-community links). Notably, the nodes that have historically transacted closely with each other are grouped into a same community, whereas the nodes that have historically transacted rarely or never with each other are grouped into different communities. Herein, the term "community" refers to a data structure indicative of relationships between the nodes of the network.

It will be appreciated that each community comprises two or more nodes (corresponding to two or more institutions). Moreover, different communities may comprise different number of nodes. As an example, given transaction data pertaining to historical transactions undertaken by 1000 institutions, 1000 nodes of a network created using the given transaction data may be grouped into 4 communities having 500 nodes, 300 nodes, 150 nodes and 50 nodes.

In an embodiment, in the network community detection is implemented by employing at least one computational algorithm. In an embodiment, the data processing arrangement 404 employs the at least one computational algorithm to perform network community detection. In an embodiment, the at least one computational algorithm is at least one of: Louvain algorithm, spectral algorithm, Girvan-Newman algorithm, Clauset-Newman-Moore algorithm, Infomap algorithm, Markov Cluster algorithm, Newman algorithm.

In an embodiment, the network has a perfect community structure. In such a case, the plurality of institutions 204 are grouped into the plurality of communities in a manner that the financial transactions could only occur between the institutions belonging to same community, and never between the institutions belonging to different communities. In such a case, each thread would contain the institutions that correspond to a single community.

In another embodiment, the network has an imperfect (namely, real-world) community structure. In such a case, the plurality of institutions 204 are grouped into the plurality of communities in a manner that the financial transactions could occur between the institutions belonging to the same community, as well as between the institutions belonging to the different communities. In such a case, a community classification forms starting point of assigning the institutions to the plurality of threads.

In an embodiment, when grouping the nodes into the plurality of communities, a number of communities is constrained to be equal to a number of threads when the number of threads is pre-known. It will be appreciated that constraining the number of communities to be equal to the number of threads simplifies the process of assigning the plurality of institutions to the plurality of threads is performed based on the network community detection.

Alternatively, in an embodiment, optimizing a number of the plurality of threads is based on number of communities determined during network community detection. In such a case, the number of the plurality of threads is constrained to be equal to the number of communities determined during the network community detection. It will be appreciated that constraining the number of the plurality of threads to be equal to the number of communities simplifies the process of creating the number of the plurality of threads.

In an embodiment, assigning the plurality of institutions 204 to the plurality of threads T1-T3 is performed based on the network community detection by:
preliminarily assigning to a given thread, institutions belonging to a same community;
identifying, for each institution, one or more other institutions with which said institution has a transaction history;
determining, for the one or more other institutions corresponding to a given institution, whether or not there already exists any thread to which both of a given other institution and the given institution are assigned; and
assigning the given institution to a smallest thread to which the given other institution is preliminarily assigned, when it is detected that there does not exist any thread to which both of the given other institution and the given institution are assigned.

In an embodiment, the data processing arrangement 404 is configured to assign the plurality of institutions to the plurality of threads T1-T3 based on the network community detection, as described above.

Optionally, in this regard, the assignment of the plurality of institutions 204 to the plurality of threads T1-T3 is optimized, based on a community structure. The community structure is formed by the payment flows, and is represented by the detected network communities.

In an embodiment, the given thread is preliminarily assigned institutions belonging to the same community. In such a case, institutions belonging to different communities are assigned to different threads. It will be appreciated that such preliminary assignment is simplified when the number of communities is constrained to be equal to the number of threads.

In an embodiment, when it is determined that there already exists at least one thread to which both of the given other institution and the given institution are assigned, no further action with regard to assigning the given institution is required. However, in another embodiment, when it is determined that there does not exist any thread to which both of the given other institution and the given institution are assigned, further action is required for assigning the given institution to a thread such that financial transactions between the given institution and the given other institution are enabled. Therefore, for each institution amongst the one or more other institutions corresponding to the given institution, if there does not already exist a thread to which both the given institution and said institution are assigned, the given institution is assigned to the smallest thread to which said institution is preliminarily assigned. Herein, the term "smallest thread" refers to a least populated thread, in terms of number of institutions assigned thereto, amongst the threads to which said institution is preliminarily assigned.

In an example, the parallel fund transfer system may comprise three threads Y1, Y2, and Y3. There may be ten institutions I1, I2, I3, I4, I5, I6, I7, I8, I9 and I10 that belong to three communities Z1, Z2, and Z3. Herein, the institutions I1 and I2 may belong to the community Z1. Likewise, the institutions I3, I4, and I5 may belong to the community Z2. Likewise, the institutions I6, I7, I8, I9 and I10 may belong to the community Z3. Herein, the institutions I1 and I2 may be preliminarily assigned to the thread Y1. Likewise, the institutions I3, I4, and I5 may be preliminarily assigned to the thread Y2. Likewise, the institutions I6, I7, I8, I9 and I10 may be preliminarily assigned to the thread Y3. The institution I2 may have a transaction history with the institution I4. Herein, it may be detected that there does not exist any thread (amongst the threads Y1-Y3) to which both of the institutions I2 and I4 are already assigned. In such a case, the institution I2 may be assigned to the smallest thread Y2 to which the institution I4 is preliminarily assigned.

Financial transactions are assigned 306 to the plurality of threads T1-T3 based at least on sending institution-receiving institution pairs assigned to the plurality of threads T1-T3. Notably, the data processing arrangement 404 of the system 400 is configured to assign the financial transactions to the plurality of threads T1-T3.

In an embodiment, the data processing arrangement 404 comprises a thread selection module (such as the thread selection module 206 of FIG. 2), wherein the thread selection module is configured to assign the financial transactions to the plurality of threads T1-T3. The "thread selection module" is a specialized module of the data processing arrangement 404, that is dedicatedly employed for logical assignment of the financial transactions to the plurality of threads T1-T3.

Upon receiving requests for the financial transactions at the inter-institution transaction system 402, the financial transactions are routed to the plurality of threads T1-T3. As described earlier, each thread among the plurality of threads T1-T3 has at least one sending institution-receiving institution pair assigned thereto. Therefore, a given financial transaction is assigned to only that thread which has the sending institution-receiving institution pair of the given financial transactions assigned to it. There may be one or more such threads to which the sending institution-receiving institution pair of the given financial transactions assigned, in which case one thread amongst said threads is to be selected for assignment of the given financial transaction.

It will be appreciated that the data processing arrangement 404 of the system 400 intelligently assigns the financial transactions to the plurality of threads T1-T3 to adapt for changes in flow (namely, dynamic flow) of the financial transactions. It will also be appreciated that, said assignment is based on analytical expertise of the data processing arrangement 404 that enables intelligent selection of most appropriate thread. In this regard, when the most appropriate thread is selected, there is less likelihood of delay and/or failure of the financial transactions.

In an embodiment, assigning the financial transactions to the plurality of threads T1-T3 comprises:
identifying, for a given sending institution-receiving institution pair pertaining to a given financial transaction, one or more threads to which said pair is assigned; and selecting a given thread to which the given financial transaction is to be assigned, based on a number of the one or more threads to which said sending institution-receiving institution pair is assigned, and optionally at least one of: a volume of financial transactions that have been processed at the one or more threads within a recent time period, liquidity allocated to the one or more threads and/or a sequence of the one or more threads to which said sending institution-receiving institution pair is assigned.

In this regard, when the given financial transaction is received at the inter-institution transaction system 402, all threads to which the given sending institution-receiving institution pair pertaining to the given financial transaction is assigned are identified. In this regard, the one or more threads to which the given sending institution-receiving institution pair is assigned is identified from amongst the plurality of threads. In this regard, sending institution-receiving institution pairs assigned to the plurality of threads are checked to identify those one or more threads among the plurality of threads to which the given sending institution-receiving institution pair is assigned. In some cases, the given sending institution-receiving institution pair would be assigned to only one thread, whereas in other cases, the given sending institution-receiving institution pair would be assigned to multiple threads.

In an embodiment, the given thread to which the given financial transaction is to be assigned is selected based on the number of the one or more threads to which said pair is assigned. As an example, when the given sending institution-receiving institution pair is assigned to only one thread, the given financial transaction is assigned to that thread. Alternatively, when the given sending institution-receiving institution pair is assigned to multiple threads, one thread among the multiple threads is selected as the given thread. In such a case, at least one of other criteria listed above is employed for selection of the given thread. Selection of the given thread based on the other criteria (listed above) is described in detail in conjunction with FIGS. 6 and 7.

Figure 6:
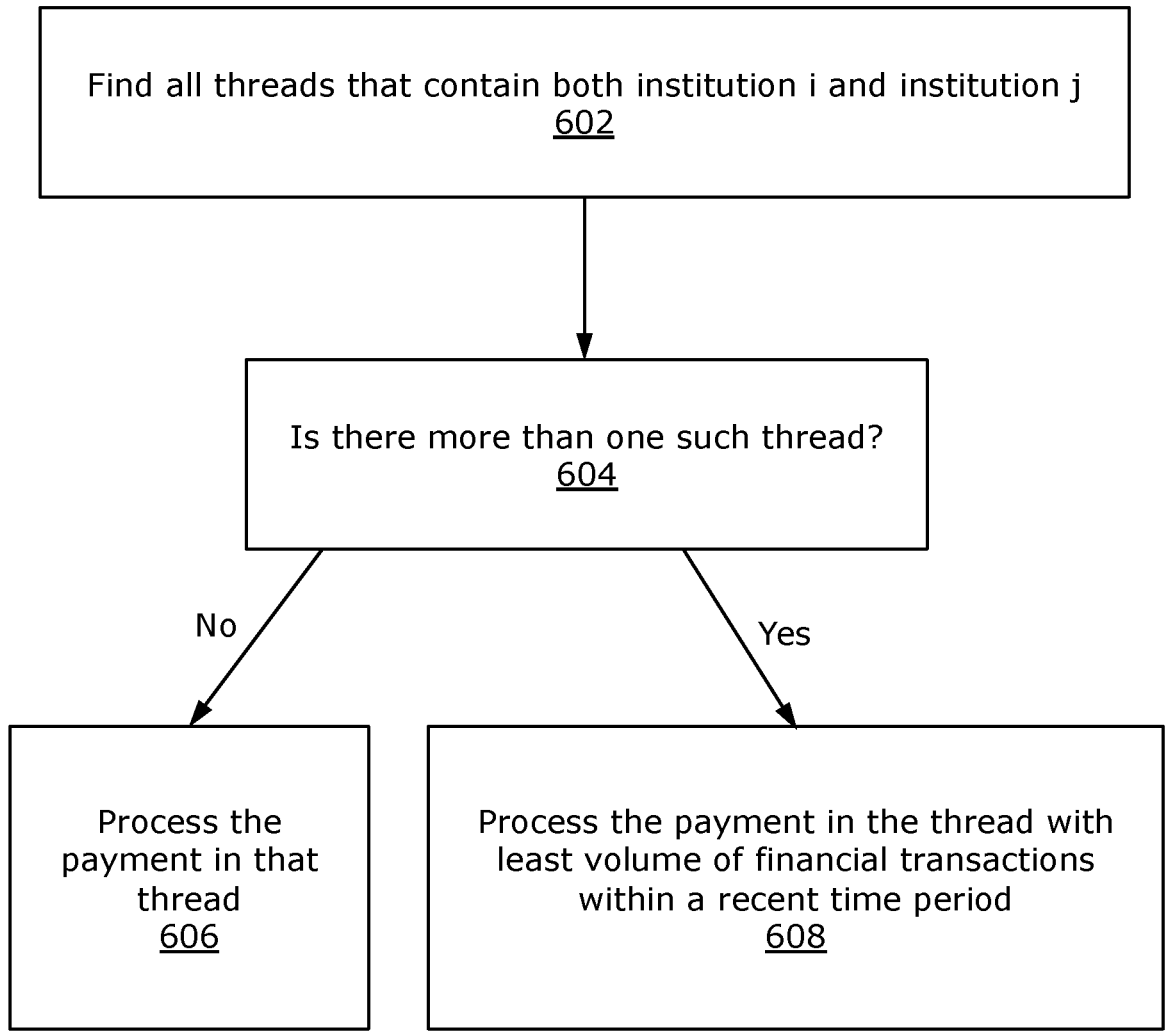
FIG. 6 illustrates an exemplary scenario of assigning a financial transaction to a thread, according to one embodiment of the teachings herein.

Referring to FIG. 6, illustrated is an exemplary scenario of assigning a financial transaction to a thread, according to one embodiment of the teachings herein. Let us consider the financial transaction to be from institution i to institution j. The financial transaction is assigned to the thread (among a plurality of threads) based at least on sending institution-receiving institution pairs assigned thereto. Therefore, at 602, there are found all threads that contain both the institution i and the institution j. Notably, at 602, there are identified all threads that contain sending institution-receiving institution pair i-j. At 604, it is determined whether or not the number of threads found at 602 are more than one. In a first case (corresponding to branch 'No' extending from 604), there is only one thread to which the sending institution-receiving institution pair i-j is assigned. In such a case, at 606, that thread is selected as the thread to which the financial transaction is to be assigned. However, in a second case (corresponding to branch 'Yes' extending from 604), there is more than one thread to which the sending institution-receiving institution pair i-j is assigned. In such a case, at 608, one thread amongst said more than one thread is selected for assigning the transaction, based on a volume of financial transactions that have been processed at the threads within a recent time period. As an example, a thread having least volume of financial transactions within a recent time period may be selected (from amongst the more than one thread) for assigning the transaction.

In an embodiment (depicted, for example, in FIG. 6), selecting a given thread to which the given financial transaction is to be assigned further comprises:
  determining if there is only one thread to which said pair is assigned, and if so, selecting that thread as the given thread, and,
  if there is more than one thread to which said pair is assigned, selecting the given thread based on the volume of financial transactions that have been processed at the threads within a recent time period.

In this regard, also relating to FIG. 6, selection of the given thread is optionally based on two criteria: firstly—the number of the one or more threads to which said pair is assigned, and secondly—the volume of financial transactions that have been processed at the one or more threads within the recent time period.

In an embodiment, when there exist more than one threads to which the sending institution-receiving institution pair of the given financial transaction is assigned, a thread that has least volume of financial transactions that have been processed within the recent time period amongst the more than one thread is selected as the given thread. It will be appreciated that optionally, the "recent time period" is considered when using the volume of financial transactions that have been processed at the more than one threads as a selection criterion for the given thread. In this way, assigning the financial transactions to the plurality of threads is optimized, based on a recent activity in candidate threads. The volume of financial transactions processed at the one or more threads within the recent time period is an indicative of a recent transaction processing burden on the one or more threads. In such a case, a thread that has a low recent transaction processing burden amongst the one or more threads is selected as the given thread. This expedites settlement of a given financial transaction which otherwise would be compromised when a thread that has a high recent transaction processing burden is selected. In an embodiment, the recent time period is selected to be one of: several seconds, several minutes, several hours. In an example, the recent time period of five minutes may be selected.

In an example, there may be two institutions D and E constituting a sending institution-receiving institution pair D-E for a given financial transaction. The sending institution-receiving institution pair D-E may be assigned to three threads W1, W3, and W3. Herein, the threads W1, W2, and W3 may have processed 130, 145, and 100 financial transactions in previous (recent) five minutes, respectively. In such a case, the thread W3 may be selected as a given thread to which the given financial transaction may be assigned.

Figure 7:
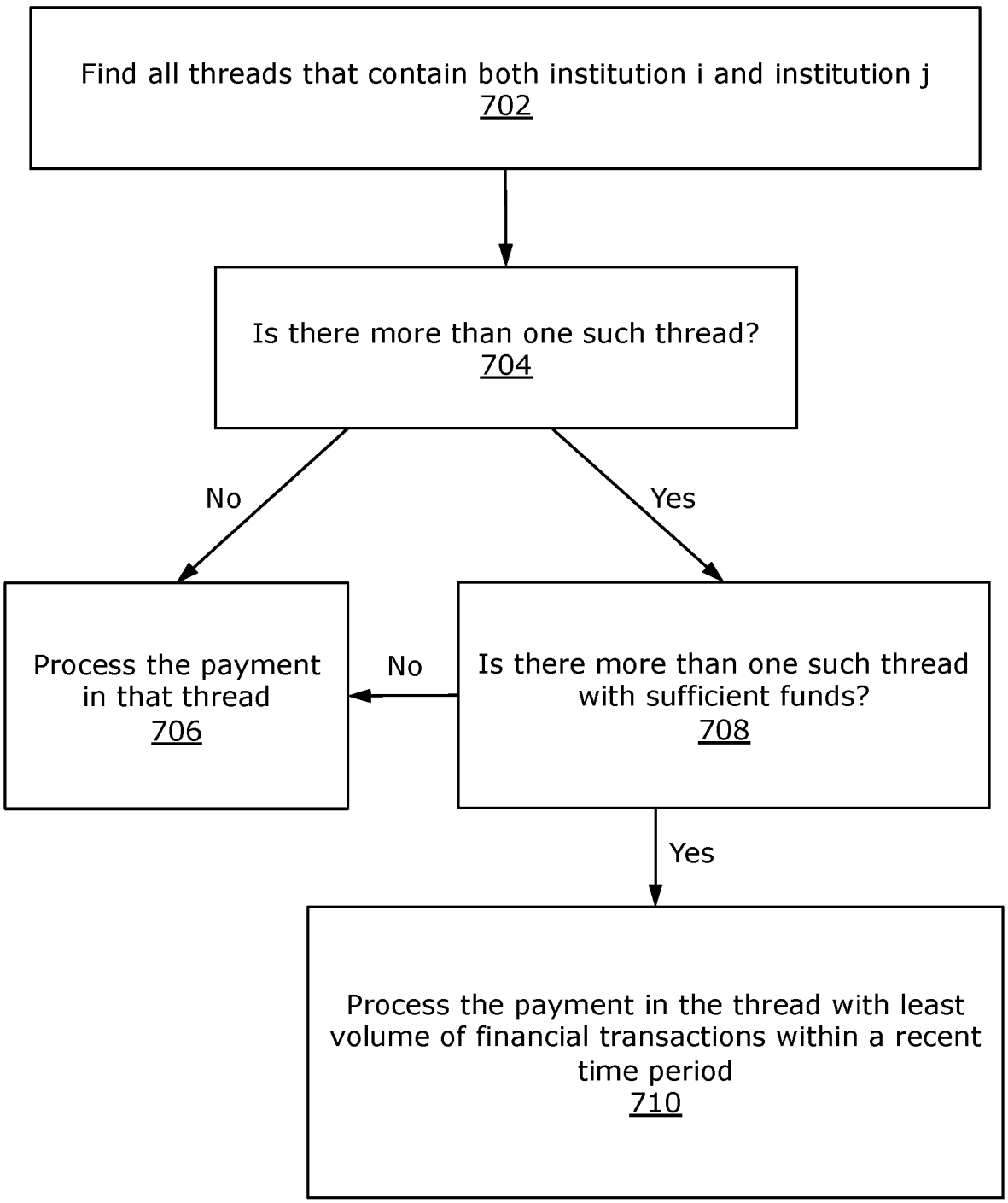
FIG. 7 illustrates another exemplary scenario of assigning a financial transaction to a thread, according to one embodiment of the teachings herein.

Referring to FIG. 7, illustrated is another exemplary scenario of assigning a financial transaction to a thread, according to one embodiment of the teachings herein. Let us consider the financial transaction to be from institution i to institution j. The financial transaction is assigned to the thread (among a plurality of threads) based at least on sending institution-receiving institution pairs assigned to the plurality of threads. Therefore, at 702, there are found all threads that contain both the institution i and the institution j. Notably, at 702, there are identified all threads that contain sending institution-receiving institution pair i-j. At 704, it is determined whether or not the number of threads found at 702 are more than one. In a first case (corresponding to branch 'No' extending from 704), there is only one thread to which the sending institution-receiving institution pair i-j is assigned. In such a case, at 706, that thread is selected as the thread to which the financial transaction is to be assigned. However, in a second case (corresponding to branch 'Yes' extending from 704), there is more than one thread to which the sending institution-receiving institution pair i-j is assigned. In such a case, at 708, there is determined whether or not there are multiple threads among the more than one thread that have sufficient liquidity (namely, funds) allocated to cover the financial transaction. In one case (corresponding to branch 'No' extending from 708), there is only one thread among the more than one thread having sufficient liquidity allocated to cover the financial transaction. In such a case, that one thread is selected as the thread to which the financial transaction is to be assigned. In another case (corresponding to branch 'Yes' extending from 708) there are multiple threads among the more than one thread that have sufficient liquidity allocated to cover the financial transaction. In such a case, at 710, one thread amongst said multiple threads is selected for assigning the transaction, based on a volume of financial transactions that have been processed at the threads within a recent time period. As an example, a thread having least volume of financial transactions within a recent time period may be selected (from amongst the multiple threads having sufficient funds) for assigning the transaction.

In an embodiment, there are no threads across which the sending institution has sufficient liquidity allocated to cover the given financial transaction. In one case, the given financial transaction is to be assigned to a given thread by selecting the given thread based on the volume of financial transactions that have been processed at the threads within a recent time period. In another case, the given financial transaction is to be assigned to a given thread by selecting the given thread based on maximum available liquidity the sending institution has in the given thread. It will be appreciated that in both cases, the given financial transaction would be queued until the sending bank obtains supplementary liquidity required to cover the given financial transaction.

In an embodiment (depicted, for example, in FIG. 7), selecting a given thread to which the given financial transaction is to be assigned further comprises determining if the liquidity allocated to a thread is sufficient to cover the given financial transaction before selecting the thread as the given thread.

In this regard, also relating to FIG. 7, selection of the given thread is based optionally on three criteria: firstly—the number of the one or more threads to which said pair is assigned, secondly—sufficiency of the liquidity allocated to the one or more threads, and thirdly—the volume of financial transactions that have been processed at the one or more threads within the recent time period.

It will be appreciated that, whenever possible, for any thread to be selected as the given thread, said thread must have sufficient liquidity to cover the given financial transaction. Only when said thread has sufficient liquidity, can it be ensured that the financial transaction can be processed successfully at said thread. When the liquidity allocated to the thread is insufficient to cover the given financial transaction, selecting the thread as the given thread would lead to transaction delay or transaction failure on account of insufficient liquidity.

Notably, in case of the transaction delay, the financial transaction would not be settled immediately, whereas in case of the transaction failure, the financial transaction would not be settled.

In an embodiment, selecting a given thread to which the given financial transaction is to be assigned comprises:
 determining if there is only one thread having sufficient liquidity to cover the given financial transaction, and if so, selecting that thread as the given thread, and
 if there is more than one thread having sufficient liquidity to cover the given financial transaction, selecting the given thread as a thread having least volume of financial transactions that have been processed thereat within a recent time period.

In an example, there may be two institutions J and K constituting a sending institution-receiving institution pair J-K for a given financial transaction worth $50,000. The sending institution-receiving institution pair J-K may be assigned to three threads M1, M2, and M3. Herein, the sending institution J may have liquidity worth $40,000 in the thread M1, may have liquidity worth $100,000 in the thread M2, and may have liquidity worth $80,000 in the thread M3. The thread M1 may have processed 50 financial transactions in previous three minutes. The thread M2 may have processed 120 financial transactions in previous three minutes. The thread M3 may have processed 90 financial transactions in previous three minutes. Herein, the thread M3 may be selected as a given thread to which the given financial transaction may be assigned, based on liquidity allocated to the threads M1-M3 to cover the financial transactions and volume of financial transactions that have been processed at the threads M1-M3 within a recent time period.

In an embodiment, selecting a given thread to which the given financial transaction is to be assigned further comprises:
 determining if there is only one thread to which said pair is assigned, and if so, selecting that thread as the given thread, and,
 if there is more than one thread to which said pair is assigned, selecting the given thread based on the sequence of the one or more threads to which said sending institution-receiving institution pair is assigned.

In this regard, selection of the given thread is optionally based on two criteria: firstly—the number of the one or more threads to which said pair is assigned, and secondly—the sequence of the one or more threads to which said sending institution-receiving institution pair is assigned.

In an embodiment, when there exist more than one threads to which the sending institution-receiving institution pair of the given financial transaction is assigned, a thread is selected as the given thread based on the sequence of the one or more threads to which said sending institution-receiving institution pair is assigned, wherein said sequence defines a priority order of thread selection amongst the more than one thread. When there are multiple threads to which the sending institution-receiving institution pair of the given financial transaction is assigned, a thread that has a highest priority amongst the sequence of the one or more threads for the given transaction is selected as the given thread.

In an example, there may be two threads U1 and U2 to which a sending institution-receiving institution pair is assigned. For a given financial transaction for the sending institution-receiving institution pair, the thread U2 may have a higher priority (or would be first in the sequence) than the thread U1 (which would be second in the sequence). Herein, for a first financial transaction, the sending institution-receiving institution pair may be assigned to the thread U2, and for a second financial transaction, the sending institution-receiving institution pair may be assigned to the thread U1.

The financial transactions are processed 308 at their corresponding threads. Notably, the data processing arrangement 404 of the system 400 is configured to process the financial transactions at their corresponding threads. It will be appreciated that processing the financial transactions is a multi-step process that is executed by corresponding single fund transfer systems of the plurality of threads. Notably, the processing of a given financial transaction involves moving liquid assets from an account of the sending institution to an account of the receiving institution. In an embodiment, the processing of the given financial transaction involves at least two individual operations: debiting the account of the sending institution by the value of the given financial transaction, and crediting the account of the receiving institution by the same amount. In an example, the value of the financial transaction may be $80,000.

Further, an embodiment of the teachings described herein provides a computer-readable medium carrying instructions that when loaded into and executed by a data processing arrangement (such as the data processing arrangement 404) causes the data processing arrangement to execute the aforesaid method 300.

The computer-readable medium can direct a computer, other programmable data processing apparatus, or other devices to function in a particular manner, such that the instructions stored in the computer-readable medium cause a series of steps to implement the function specified in a flowchart and/or a schematic block diagram corresponding to the instructions. The computer-readable medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

Further, an embodiment of the teachings described herein provides a software module system comprising software modules to be executed by a data processing arrangement (such as the data processing arrangement 404) for establishing and managing an inter-institution transaction system (such as the inter-institution transaction system 402), wherein the software modules comprises:

a software module for creating a plurality of threads to constitute a parallel fund transfer system, wherein each thread is a replica of a single fund transfer system, and wherein the plurality of threads are to be operated in parallel;

a software module for assigning a plurality of institutions to the plurality of threads, wherein a given institution is assigned as a sending institution and/or a receiving institution of a financial transaction to at least one thread, and a given thread has at least one sending institution-receiving institution pair assigned thereto;

a software module for assigning financial transactions to the plurality of threads based at least on sending institution-receiving institution pairs assigned to the plurality of threads; and a software module for processing the financial transactions at their corresponding threads.

Throughout the present disclosure, the term "software module" refers to a software program comprising executable instructions to perform one or more distinctive data processing operations. In an example, the software modules of the software module system may include, but are not limited to, a thread creating software module, a thread selection software module, a transaction assignment software module, and a transaction processing software module.

In an embodiment, all software modules of the software module system are implemented as separate software modules. In another embodiment, two or more software modules of the software module system are implemented as an integrated software module.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of establishing and managing an inter-institution transaction system, the method comprising:

creating a plurality of threads to constitute a parallel fund transfer system, wherein the parallel fund transfer system has a parallel processing architecture with the plurality of threads of execution paths operating in parallel for processing financial transactions, and wherein each thread is a replica of a single fund transfer system;

assigning a plurality of institutions to the plurality of threads, wherein a given institution is assigned as a sending institution or a receiving institution of a financial transaction to at least one thread, and a given thread has at least one sending institution-receiving institution pair assigned thereto;

assigning financial transactions to the plurality of threads based at least on sending institution-receiving institution pairs assigned to the plurality of threads, wherein assigning the financial transactions to the plurality of threads comprises:

identifying, for a given sending institution-receiving institution pair pertaining to a given financial transaction, one or more threads to which said pair is assigned; and selecting a given thread to which the given financial transaction is to be assigned, based on a number of the one or more threads to which said sending institution-receiving institution pair is assigned, and at least one of: a volume of financial transactions that have been processed at the one or more threads within a recent time period, liquidity allocated to the one or more threads or a sequence of the one or more threads to which said sending institution-receiving institution pair is assigned; and processing the financial transactions at their corresponding threads.

2. A method according to claim 1, wherein the given institution is assigned to two or more threads, and the method further comprises dynamically allocating liquidity of the given institution to each of the two or more threads.

3. A method according to claim 2, wherein the dynamic allocation of the liquidity of the given institution to each of the two or more threads is based on at least one of: a number of counterparties of the given institution in each of the two or more threads, current liquidity requirements across the two or more threads, projected liquidity requirements across the two or more threads, current liquidity balance of the given institution.

4. A method according to claim 1, further comprising optimizing a number of threads in the parallel fund transfer system based on at least one of: a number of institutions associated with the inter-institution transaction system, an average volume of the financial transactions processed by the inter-institution transaction system, a flow of financial transactions between the plurality of institutions.

5. A method according to claim 1, further comprising performing network community detection by:
  obtaining transaction data pertaining to historical transactions undertaken by the plurality of institutions;
  creating a network of nodes and links using the transaction data, wherein each institution among the plurality of institutions is represented as a node of the network and a financial transaction between two institutions is represented as a link between nodes of the two institutions; and
  grouping the nodes into a plurality of communities based on a number of the links between the nodes, wherein a number of intra-community links is substantially greater than a number of inter-community links, and wherein each community comprises two or more institutions.

6. A method according to claim 5, wherein when grouping the nodes into the plurality of communities, a number of communities is constrained to be equal to a number of threads when the number of threads is pre-known.

7. A method according to claim 5, wherein assigning the plurality of institutions to the plurality of threads is performed based on the network community detection by:
  preliminarily assigning to a given thread, institutions belonging to a same community;
  identifying, for each institution, one or more other institutions with which said institution has a transaction history;
  determining, for the one or more other institutions corresponding to a given institution, whether or not there already exists any thread to which both of a given other institution and the given institution are assigned; and
  assigning the given institution to a smallest thread to which the given other institution is preliminarily assigned, when it is detected that there does not exist any thread to which both of the given other institution and the given institution are assigned.

8. A method according to claim 1, wherein when assigning the plurality of institutions to the plurality of threads, a number of threads to which the given institution is assigned is minimized whilst ensuring that prospective financial transactions of the given institution would be settled in at least one thread.

9. A method according to claim 1, wherein selecting a given thread to which the given financial transaction is to be assigned further comprises:
  determining if there is only one thread to which said pair is assigned, and if so, selecting that thread as the given thread, and,
  if there is more than one thread to which said pair is assigned, selecting the given thread based on the volume of financial transactions that have been processed at the threads within a recent time period.

10. A method according to claim 1, wherein selecting a given thread to which the given financial transaction is to be assigned further comprises determining if the liquidity allocated to a thread is sufficient to cover the given financial transaction before selecting the thread as the given thread.

11. A non-transitory computer-readable medium carrying instructions that when loaded into and executed by a processor causes the processor to execute the method of claim 1.

12. A software module system comprising software modules to be executed by a processor for establishing and managing an inter-institution transaction system, wherein the software modules are non-transitory software modules, wherein the software modules further comprises:
  a software module executed by the processor for creating a plurality of threads to constitute a parallel fund transfer system, wherein the parallel fund transfer system has a parallel processing architecture with the plurality of threads of execution paths operating in parallel for processing financial transactions, and wherein each thread is a replica of a single fund transfer system;
  a software module executed by the processor for assigning a plurality of institutions to the plurality of threads, wherein a given institution is assigned as a sending institution or a receiving institution of a financial transaction to at least one thread, and
a given thread has at least one sending institution-receiving institution pair assigned thereto;
  a software module executed by the processor for assigning financial transactions to the plurality of threads based at least on sending institution-receiving institution pairs assigned to the plurality of threads, wherein assigning the financial transactions to the plurality of threads comprises:
  identifying, for a given sending institution-receiving institution pair pertaining to a given financial transaction, one or more threads to which said pair is assigned; and
  selecting a given thread to which the given financial transaction is to be assigned, based on a number of the one or more threads to which said sending institution-receiving institution pair is assigned, and at least one of: a volume of financial transactions that have been processed at the one or more threads within a recent time period, liquidity allocated to the one or more threads or a sequence of the one or more threads to which said sending institution-receiving institution pair is assigned; and
  a software module executed by the data processing arrangement for processing the financial transactions at their corresponding threads.

13. A system for establishing and managing an inter-institution transaction system, the system comprising a processor configured to:
  create a plurality of threads to constitute a parallel fund transfer system, wherein the parallel fund transfer system has a parallel processing architecture with the plurality of threads of execution paths operating in parallel for processing financial transactions, and wherein each thread is a replica of a single fund transfer system;
  assign a plurality of institutions to the plurality of threads, wherein
a given institution is assigned as a sending institution or a receiving institution of a financial transaction to at least one thread, and a given thread has at least one sending institution-receiving institution pair assigned thereto;
  assign financial transactions to the plurality of threads based at least on sending institution—receiving institution pairs assigned to the plurality of threads, wherein assigning the financial transactions to the plurality of threads comprises:

identifying, for a given sending institution-receiving institution pair pertaining to a given financial transaction, one or more threads to which said pair is assigned; and selecting a given thread to which the given financial transaction is to be assigned, based on a number of the one or more threads to which said sending institution-receiving institution pair is assigned, and at least one of: a volume of financial transactions that have been processed at the one or more threads within a recent time period, liquidity allocated to the one or more threads or a sequence of the one or more threads to which said sending institution-receiving institution pair is assigned; and process the financial transactions at their corresponding threads.

14. A system according to claim 13, wherein the given institution is assigned to two or more threads, and the processor is further configured to dynamically allocate liquidity of the given institution to each of the two or more threads.

* * * * *